United States Patent [19]
Darjee et al.

[11] Patent Number: 5,286,541
[45] Date of Patent: Feb. 15, 1994

[54] COATED ABRASIVE HAVING COMBINATION BACKING MEMBER

[75] Inventors: Dhiraj H. Darjee; Richard W. Kalita, both of Ballston Lake; Gregg M. Bosak, Hoosick Falls; Eugene Zador, Ballston Lake, all of N.Y.; William F. McCutcheon, Mission, Tex.

[73] Assignee: Norton Company, Worcester, Mass.

[21] Appl. No.: 943,077

[22] Filed: Sep. 10, 1992

[51] Int. Cl.$^5$ ................................................ C09K 3/14
[52] U.S. Cl. .......................................... 428/40; 51/295; 51/297; 51/298; 51/308; 51/309; 428/64; 428/67; 428/147; 428/150; 428/219; 428/220; 428/325; 428/609
[58] Field of Search .............. 428/40, 64, 409, 67, 428/220, 325, 219, 147, 150; 51/295, 297, 298, 308, 309

[56] References Cited

U.S. PATENT DOCUMENTS

| | | | |
|---|---|---|---|
| 4,240,807 | 12/1980 | Kronzer | 51/295 |
| 4,554,765 | 11/1985 | Grimes et al. | 51/401 |
| 4,629,473 | 12/1986 | Ruid et al. | 51/295 |
| 4,988,554 | 1/1991 | Peterson | 51/295 |

*Primary Examiner*—Ellis P. Robinson
*Assistant Examiner*—Nasser Ahmad
*Attorney, Agent, or Firm*—David Bennett

[57] ABSTRACT

Coated abrasive material having a combination backing member. The combination backing member has as a bottom member a conventional backing member substrate used in the manufacture of coated abrasive material such as cylinder paper coated with a polymeric layer. The polymer layer provides a relatively smooth surface for application of the maker coat during manufacture of the coated abrasive material. The coated abrasive member can be used in diverse applications such as the fine finishing of particle board and offhand grinding of automobile body seams.

7 Claims, No Drawings

COATED ABRASIVE HAVING COMBINATION BACKING MEMBER

BACKGROUND OF INVENTION

This invention relates, in general, to Coated Abrasive material. More particularly, the invention relates to a combination backing member for use in the manufacture of Coated Abrasive material, to the method of manufacture of such a combination backing member and Coated Abrasive material incorporating the same, and to certain applications for Coated Abrasive material having such a backing member.

DESCRIPTION OF THE PRIOR ART

In general, coated abrasive materials comprise a backing member, a "maker coat" or layer of adhesive applied to the top surface of the backing member, followed by the application of abrasive grains onto the maker coat while such is still wet. The maker coat is then partially cured to a suitably hardened layer whereby the abrasive grains are adhered to the backing member. Afterwards a second adhesive layer termed "a size coat" is typically applied on top of the maker coat and the adhesive layers are then fully cured. The coated abrasive material is then flexed to break up the hard adhesive layers and to provide a suitably flexible coated abrasive material. Subsequently, the coated abrasive material is formed into various abrasive products, e.g., sandpaper sheets, abrasive disks, endless belts, etc., depending somewhat upon the particular end use for the coated abrasive material, the specific components of the coated abrasive, material manufactured, and its manner of processing.

The backing member used in the manufacture of coated abrasive material can be of various materials dependent somewhat upon the application intended for the coated abrasive material, e.g., paper, textile fabric, plastic film such as dimensionally stable polyester film, and combinations of these materials. In the case of a textile fabric backing member, the backing member may be, for example, a woven or stitch-bonded cloth such as rayon, cotton, nylon and polyesters, and cloth combinations e.g., nylon fill and polyester warp yarns.

It is commonly known that the surface of a paper layer is characterized by a certain inherent roughness, i.e., it is defined by peaks and valleys. The degree of such roughness (or smoothness) depends somewhat upon the particular paper involved. This roughness, i.e., lack of smoothness, is of some concern in coated abrasive material relative to the dimensions of the abrasive grain. This concern is greatest when the abrasive grain is of a fine grit, e.g. 240 or finer, in coated abrasive material intended for fine finishing applications.

If the surface roughness of the paper backing member is not reduced, that roughness will be imparted to the surface of the coated abrasive material. This can result in an undesireable scratch pattern on the work piece being ground if some of the abrasive grains protrude further from the backing member than others.

Another key problem of paper-backed abrasive sheets, particularly discs, is edge chipping. This occurs when the bond between the paper substrate and the maker coat fails before the abrasive has become dulled. Large pieces of the abrasive bearing maker resin coat flake off from the substrate leading to accelerated failure of the disc. This problem is made worse by attempts to reduce the surface roughness of the paper such as by calendaring or filling since this minimizes the extent to which the maker coat can "key" on to the substrate.

An application for coated abrasive material having a paper backing member is in the offhand grinding of automobile body seams. It is desirable to grind the seams on as many cars as possible with an abrasive disc before it fails due to edge chipping or delamination of the maker coat from the backing member. Accordingly, a coated abrasive material that will allow the operator to grind the body seams on more cars with one abrasive disc than is now possible using coated abrasive discs with conventional paper backing members, would be very useful for such an application. The use of coated abrasive material allowing increased grinding efficiency or performance would be beneficial to the automobile manufacture as such would result in savings to the car manufacturer not only in the use of fewer abrasive discs for the grinding of body seams on the same number of cars, but also in that the operator does not have to change abrasive discs as often.

DESCRIPTION OF THE INVENTION

The present invention provides a novel, coated, paperbacked abrasive material with improved efficiency and performance in the offhand grinding of automobile body seams.

The products of the invention also provide a coated abrasive material for offhand grinding applications that has improved resistance to edge chipping and delamination compared to the abrasive material now being used.

The present invention provides a composite abrasive sheet material comprising an abrasive-containing maker resin layer and a backing material in which the backing material itself comprises a paper substrate and a polymer film. The polymer film may be extruded onto the paper directly or in a subsequent operation.

The resultant coated abrasive provides greater peel adhesion than a comparable product made without the polymer film.

While the present invention will be described hereinafter with particular reference to the Examples, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts, and is not to be understood as being restrictive.

The typical coated abrasive material of the invention comprises a combination backing member comprising a substrate or bottom member and adhered thereto, a top polymer film layer or lamina. A conventional maker coat and a layer of adhering abrasive grain is applied to the top surface of the lamina of the combination backing member.

Adhered to and overlaying the maker coat is a conventional size coat the purpose for which is to provide further bonding of the abrasive grains to the maker coat and, hence to the combination backing member.

The substrate in the combination backing member can be any paper now conventionally used as a backing member in coated abrasive material, as desired. The polymer film layer is extruded onto the paper layer. The abrasive material is bonded to the polymer film layer.

The novel characteristic of the coated abrasive product of the invention is that the peel adhesion strength between the film layer and the maker coat adheres of thereto is greater than the internal ply strength of the paper component of the backing. The main failure mode of the prior art products of the same general type when using the industry standard 170 lb/ream (288 grams/sq.meter) cylinder paper is through failure of the bond between the maker coat and the paper backing. The internal ply strength of such paper is typically about 190 gm/cm and that of lighter weight paper would be correspondingly less. However, when the combination backing member of the present invention is used, the failure occurs in the fabric of the paper through separation of the plies.

In use the abrasive-containing layer is subjected to significant frictional forces.

The maker layer is essentially non-extensible and unless the substrate layer is able to accommodate the strains by stretching without delaminating from the maker coat layer, the bond between the two layers will rupture. Poor adhesion will therefore result in a portion of the maker coat and the associated abrasive adhered thereto becoming detached. The peel adhesion test described below duplicated this failure mode and measures the ability of the combination to survive grinding conditions.

The polymer films that are able to achieve this result generally which demonstrate a peel adhesion of at least 6 lb/in (1072 grams/cm) when tested using a standard peel adhesion measuring device sold by Instron Corporation to evaluate the strength of the structure. In this test two identical one inch wide samples of the finished coated abrasive are prepared and laminated together with the grain sides adhered by an epoxy resin.

The two samples are pulled apart in an Instron machine operating at a crosshead speed of 5 inches/minute, (12.7 cm/minute) a chart speed of 5 inches/minute, (12.7 cm/minute) and a gauge length of 3 inches. In each case the backing was 170 lb/ream (288 grams/sq.meter) Arjomari Registered Trademark of Special Papers, Inc. cylinder paper. The test was repeated six times and the average is taken as the "peel adhesion".

The preferred mode of adhering the polymer film to the substrate is by extrusion coating a film of the polymer on to the backing.

If this mode of coating is used, there is another criterion that the polymer preferably meets: it should have a melt index of below about 5 dg/min. Polymers with melt indices above this level tend to be difficult to extrude as films under conditions in which they will adhere to a paper substrate.

Relatively few polymer films are capable of achieving the required level of adhesion both to the paper and to the maker coat which provides the contacting surface of the abrasive. The preferred films are ionomers which are defined as polymers containing inter chain ionic bonding. Typical commercial products of this type are copolymers of ethylene with unsaturated acid salts such as the zinc salt of acrylic acid. Commercial products of this general type are available from DuPont (Surlyn ® polymers) and Exxon (Escor ® ATZ 310, an ethylene/methyl acrylate terpolymer). Such polymers are readily extruded into films or extrusion coated directly into a paper substrate to give the laminate backing of use in this invention. The most preferred ionomer resins used in the practice of the invention are available commercially from the DuPont Company, Polymer Products department under the trade designations SURLYN 1652-1, 7940 and 8550. The SURLYN 1652-1 ionomer resin that is often used is an extrudable zinc salt of an ethylene/acrylic acid copolymer having a melt index: 5.0 dg/min., (ASTM D-1238), and a density: 0.94 g/cc. Other polymers that may be used to form useful films include for example: Polybond ®, (chemically modified polyolefins) available from BP Chemical Corp., and UNIREZ ® 2611, 2546 and 2665, (polyamides), available from Union Camp Company.

The Melt Indices of some useful polymers in the practice of this invention, measured by the ASTM D-1238 (condition 190.2/2.16) method and elongation (measured by the ASTM D-638 method on compression molded bars at a crosshead speed of 5.0 cm/min.) are as follows:

| Polymer  |        | Melt Ind.  | Elongation |
|----------|--------|------------|------------|
| Surlyn   | 1652-1 | 5.0 dg/min | 400-500%   |
|          | 7940   | 2.6 dg/min | 285%       |
|          | 8550   | 3.9 dg/min | 420%       |
|          | 9650   | 5.0 dg/min | 270%       |
|          | 9950   | 5.5 dg/min | 130%       |
| Polybond | 3001   | 5.0 dg/min | 436%       |
|          | 2006   | 5.0 dg/min | 450%       |

The paper substrate that is typically used to back abrasive discs is the so called "cylinder" paper such as is available from Special Papers, Inc. Arjomari ® line of paper products. This paper can be of various weights as desired depending somewhat upon the particular application, e.g., 130 lb/rm., (220 grams/sq.meter) 160 lbs/rm. (271 grams/sq.meter) or 170 lbs./rm (288 grams/sq.meter) cylinder paper will be found quite suitable for coated abrasive material intended for use in various offhand grinding applications.

A sandpaper makers's ream ("Rm") as used herein is equivalent to 330 square feet (30.7 sq.meters) of coating area.

The polymer can be extruded using conventional extrusion equipment designed to process polyethylene resins. The preferred ionomer resins are prepared, in general, by copolymerization of a functionalized monomer with an olefinic unsaturated monomer or direct functionalization of a preformed polymer.

The outer or top surface of the top, (polymer film), layer in the combination backing member is characterized by its "super smoothness". The "super smoothness" of the top surface will depend somewhat upon the paper. A 130 lb/rm. (220 grams/sq.meter) cylinder paper available from Special Papers, Inc. under the Registered Trademark Arjomari is conventionally used as a backing member for coated abrasive material. This paper backing has an elastomeric barrier coat applied to its top surface by the manufacturer and typically has a smoothness value (Ra - measured in microns) of 2.67. After coating with Surlyn 1652-1 layer, the upper (coated) surface has a smoothness value of 0.51 micron. The smoothness value $R_a$ is defined as the arithmetic average of the absolute distances above or below the mean surface plane of each surface point. It is therefore a measure of the average deviation from the mean surface plane and as such the smaller the value of $R_a$, the smoother the surface.

Thus the combination backing member of this invention having a paper substrate, is considerably more smooth than the same front-filled and sized paper backing members now used. It is believed quite surprising that such a smooth surface could also be obtained without the front finishing conventionally done.

The thickness of the top plastic layer of the combination backing member can vary somewhat. This will depend, at least in part, on the particular bottom member used in the manufacture of the combination backing member. In general, however, it has been found that satisfactory results will be obtained when the thickness of the top layer is about 3–4 mils (0.076 mm–0.102 mm).

The maker coat can be any of the conventional resinous materials now used in the manufacture of coated abrasive material, i.e., heat-hardenable resins such as the phenol-aldehydes, e.g., phenol-formaldehyde, epoxy, resins, ureaformaldehyde, polyesters and the like. The size coat can be of the same, or of a different, composition as the maker coat, as typically provided. For example, where the size coat is of a heat-hardened resinous material, the maker adhesive coat can be of either glue or resinous material, as desired.

Rather than a heat-hardened resin, the maker and size coats, or either can be a radiation curable (E-Beam or UV) resin and compositions thereof. An example of a radiation curable resin maker adhesive is disclosed in U.S. Pat. No. 4,644,703, assigned to Norton Company, the assignee of this invention. Such UV radiation curable maker adhesives typically comprise acrylate functionality.

The abrasive grains can be of any abrasive material now typically used in the manufacture of coated abrasive material.

Examples of such include silicon carbide, fused alumina, filamentary sol gel alumina abrasive grains such as disclosed in U.S. Pat. No. 5,103,598 assigned to Norton Company, seeded or unseeded sol gel aluminas, fused polycrystalline alumina-zirconia compositions, etc., or a blend of any such abrasive grains. The abrasive grains can be of any grit size typically used in the manufacture of coated abrasive material, e.g., from 16 to 600. Nevertheless, as usual, for certain grinding applications certain grinding applications certain grit sizes will be found more effective in performance than others. We have found particularly good results in somewhat diverse grinding applications, involving abrasive grain of a finer grit size, e.g., 100 grit. The shape of the abrasive grains is preferably that of the weaker shaped grains well known to those in the coated abrasive art. Such shape is obtained by conventional crushing means.

The laminated backing member can be prepared in any of the ways known in the art. For example, a sheet of the ionomer can be passed under a heating device to soften the surface and render it tacky and then pass it, in face to face relationship with a paper sheet (of the quality required to form the substrate) between the nip of a pair of rolls such that the heat softened surface becomes adhered firmly to the paper. Alternatively, the surface can be given a conventional adhesion enhancing treatment (such as radiation exposure or application of an adhesive or a liquid softening agent) before entering the nip.

A further conventional and preferred technique is to extrude the polymer directly on to the surface of the paper substrate as it passes by the orifice of a slit extruder.

The combination backing member is then coated in conventional fashion with the maker adhesive composition. Following coating of the maker coat on the combination backing member, the abrasive grains are then applied to the wet maker coat according to usual techniques, upward electrostatic propulsion or projection being preferred in most cases. Nevertheless, in some cases the grain may be applied by gravity coating as conventionally done. The abrasive grains can be applied in such a manner as to provide one or two layers of abrasive grain, of the same or different abrasives material as typically done. For example, fused alumina grains can be gravity coated on to the wet maker adhesive, followed by electrostatic coating of grain of a fused alumina-zirconia composition.

Subsequent to application of the abrasive grain, the maker coat, if a phenol-formaldehyde resinous composition, may then be conventionally dried and partially cured, for instance, by heating for 90 minutes at a temperature increasing from about 79 to about 113 degrees C., depending on the particular formulation. This is then followed by application of the size coat or adhesive, an example of which is conventional, more dilute, aqueous solution containing 48 percent phenolformaldehyde resin and 52 percent calcium carbonate filler. Other fillers in some cases are used. The coated abrasive material is then further conventionally heated to dry the size coat and to partially cure that layer by heating 74 to about 113 degrees C. over a period of about 135 minutes. The coated abrasive sheet material is then taken down from the oven racks and rolled into rolls of convention size, after which it is further cured typically at a temperature of about 107–113 degrees C. for 6–8 hours, to fully cure the resin in the maker and size coats to the desired hardness. Subsequently, depending on the backing member, the coated abrasive material may be conditioned under controlled humidity, e.g., 50% relative humidity, 21 degrees C. overnight. The coated abrasive material is then ready for further processing into various abrasive products, e.g., abrasive discs, belts, etc. according to conventional techniques well know to those skilled in the art.

Coating of the adhesive coats into the backing member, in general, is accomplished according to conventional coating techniques, e.g., roll coating, gravure coating, etc., well known to those skilled in the art of coated abrasive manufacture.

The drying and curing of the maker and size coats can be accomplished in conventional festooned drying ovens or other means, (including radiation curing where appropriate), well known to those skilled in the art of manufacture of coated abrasive material. The particular temperature and residence times in such ovens, as earlier disclosed, will depend upon the particular adhesive compositions involved and such conditions can be provided according to well known techniques as required.

DESCRIPTION OF PREFERRED EMBODIMENTS

The following examples are illustrative of certain specific indictments of this invention; however, these examples are only for purposes of better illustrating the invention disclosed herein and are not intended to be construed as necessary limitations upon the invention unless indicated as being critical.

EXAMPLE 1

This example demonstrates the manufacture of a combination backing member according to the invention wherein the bottom member of the backing member is a 130 lb/rm. (220 grams/sq.meter) Arjomari cylinder paper.

This paper is conventionally used as a backing member in the manufacture of coated abrasive material. It is top coated by the manufacturer with an elastomeric barrier layer to prevent strike through of the maker adhesive when applied.

The cylinder paper substrate was unwound from a roll thereof in conventional manner and was passed in a horizontal plane beneath an open gas flame at 300 feet/minute (91.4 meters/min) to heat the top surface of the paper to a temperature suitably high for the purposes of this invention, yet not too high so as to be uncomfortable to the touch of an operator.

Subsequent to being heated, the paper substrate is passed around a conventional rubber roll into and through the nip formed by that roll and a conventional mirror-finished stainless steel roll according to usual techniques. The heated paper wraps around about half the circumference of the rubber roll, the heated surface being located outwardly. The metal roll is chilled by water in the usual manner.

To the outside (heated) surface of the pre-heated paper substrate there is applied by extrusion coating a layer of Surlyn 1652-2 ionomer resin.

This layer is obtained by extruding the ionomer through a conventional extruder head located directly above the nip formed by the two rolls, e.g., about 9 inches (22.8 cm) above, so that the molten resin film is extruded directly into the nip without touching the surface of either roll where it is bonded to the heat paper substrate.

The Surlyn 1652-1 ionomer resin was obtained from E. I. DuPont de Nemours in pellet form. This resin is a zinc ion poly ethylene-co-methacrylic acid ionomer having a melt index: 5.0 dg/min. ASTM D-1238.

The ionomer layer-paper substrate combination backing member after passing through the nip formed by the two rolls was taken up on take-up roll according to conventional techniques. The combination backing member is then ready to be used in the manufacture of coated abrasive material.

The metal roll is driven at a surface speed corresponding to that of the take-up roll so that a 3 mil (0.076 mm) (appox.) thick resin layer is formed.

The above manufactured coated abrasive combination backing member was observed to exhibit excellent flexibility and adhesion between the extruded ionomer layer and the bottom member.

The smoothness of the extruded film surface was determined and compared to that of conventional 130 lb/Rm. (220 grams/sq.meter) cylinder paper without the film lamina thereon with the following results:

|  | Ra Value (in microns) |
| --- | --- |
| Paper (as supplied) | 2.67 |
| Paper (Ionomer coated) | 0.51 |

EXAMPLE 2

This example demonstrates the manufacture of coated abrasive material using the combination backing member manufactured as in Example 1.

The combination backing member for Example 1 was roll coated in usual fashion on the ionomer resin lamina side with approximately 5.5 lbs/rm. (81.4 grams/sq.meter) of a conventional maker adhesive composition comprising and aqueous, caustic catalyzed resol phenol-formaldehyde composition filled with calcium carbonate (53% total solids). Water was added to the resin composition to adjust the viscosity to 2500 cps/at 100 degrees F. (37.8 degrees C.).

Subsequent to application of the maker adhesive to the combination backing member, conventional fused aluminum oxide abrasive grain (80 grit) was deposited on the wet maker adhesive layer via gravity process according to usual techniques at a rate of 10.4 lb/rm (153.8 grams/sq.meter). A sandpaper maker's ream ("Rm"), as used herein, is equivalent to 480-9 "×11" sheets or 330 square feet of coating area. Following the gravity deposition of the fused aluminum oxide, an 80 grit ceramic aluminum oxide ("S.G. Abrasive grain") disclosed in U.S. Pat. No. 4,623,364 the disclosure of which is fully incorporated herein, was applied via the usual electrostatic process (upper propulsion) at a rate of 4.6 lb/rm (68 grams/sq.meter).

The combination backing member having the double coat of abrasive grain thereon was then festooned in usual manner, and heated in a drying room to drive off the water and to partially cure the resin. This was accomplished by heating the coated abrasive material for 20 to 30 minutes in stepwise fashion from approximately 180 degrees F. to 250 degrees F. (82.2–121.1 degrees C.).

A size composition was then prepared of the same formulation as the maker adhesive composition except that it was diluted with water to provide an aqueous composition having a viscosity of approximately 700 cps at 100 degrees F. (37.8 degrees C.) and the filler was cryolite (40% by weight total solids) instead of calcium carbonate. This adhesive composition was applied to the partially cured maker coat according to conventional roll coating techniques. A sufficient amount of the size composition was applied to encapsulate the abrasive particles.

The size coated abrasive material was then again festooned in usual fashion and conventionally heated for approximately 180 minutes in step-wise manner over a temperature range of from approximately 110 degree F. to 240 degrees F. (43.3–115.6 degrees C.), to drive off the water in the size composition and to partially cure the resin in the size layer.

The thus coated combination backing member was then heated in roll form, according to usual manner, for 4 hours at 235 degrees F. (112.8 degrees C.) to fully cure both the adhesive layers i.e., the maker and size coat layers, to the desired hardness.

EXAMPLE 3

In this example, coated abrasive discs were manufactured from the coated abrasive material of Example 2, for evaluation in various offhand grinding applications.

Eight inch diameter discs were die-cut from the coated abrasive material having the combination backing member according to usual techniques. These discs were then evaluated against paper-backed abrasive discs, (having no polymer film layer), of the kind conventionally used in applications involving the offhand grinding of automobile body seams as a control.

The control discs were obtained from a standard disc roll form. Thus 8" (20.32 cm) (P.S.A.) discs are partially die-cut from coated abrasive material the backing of which has been coated with a pressure-sensitive adhesive in usual fashion. The pressure-sensitive adhesive (P.S.A.) is for adhering the disc to a back-up pad. The experimental discs were not P.S.A. coated. Instead double-faced pressure-sensitive adhesive tape was used as the means for adhering the abrasive discs to the back-up pads.

One offhand grinding application in which the experimental discs were evaluated involves the smoothing of coarse grinding marks and body hammer marks in bronze seamed areas. A control disc usually processes between 4 and 5 cars per disc in this application.

Under somewhat ideal conditions, 8 cars can be processed by a control disc. The primary mode of failure of the coated abrasive discs, in this application, is edge chipping, i.e., the abrasive grain at the perimeter of the disc, along with the maker coat is chipped away until the backing member shows. At this point, the abrasive disc used as a control is no longer usable and a new disc must be used. The 8" (20.32 cm) edge chipped discs on failure are then die-cut to a 6" (15.24 cm) disc and further used.

The test results for the 8" (20.32 cm) experimental discs in this off-hand grinding application are as follows:

Operator No. 1

Disc No. 1 processed 28 cars before edge chip failure.
Disc No. 1A processed 16 cars before failure.

Operator No. 2

Disc No. 2 processed 17 cars before failure.
Disc No. 2A processed 18 cars before failure.

Although different abrasive grains were used in the control and test discs and nothing can be said about the overall cut performance of one abrasive disc versus the other from this evaluation, the comparative results are valid, nevertheless, for comparison of edge chipping resistance using the combination backing member and the conventional paper backing member. In three out of the four evaluations, the failure mode was by dulling of the cutting action rather than by edge chipping.

Thus, it is seen that in the offhand grinding of bronze seamed areas in automobile manufacture, abrasive discs manufactured according to the invention, i.e. discs having the combination backing member disclosed in Example 1 provide dramatic improvement in edge chipping resistance over the control discs.

The experimental discs were also evaluated in an offhand grinding application encountered in automobile manufacture involving the "Reveal Area" which involves the blending of the more difficult area of bronze seams (located between bronze and lead areas). In this application, the conventional abrasive disc process an average of 3 cars per disc. With abrasive discs according to this invention 9 cars were processed, with minimal edge chipping, until the abrasive discs ceased cutting. Thus it is seen that, in this test as in the first offhand grinding evaluation, coated abrasive discs having the combination backing member resulted in improved resistance to edge chipping.

The equipment used in these evaluations was a conventional Atlas Capco (Sweden) Portable Grinder, Model LSS53. The grinder was operated at 4000–4500 RPM. Conventional Ferro Low Loft (soft) Nos. 907 and 608D back-up pads were used.

EXAMPLE 4

This example demonstrates the performance of coated abrasive material according to the invention in another offhand grinding application involving automobiles.

Coated abrasives discs were conventionally die-cut from the coated abrasive material of Example 2, according to usual techniques, to provide 8" (20.32 cm) diameter discs. These discs were then evaluated for edge chipping resistance against the paper discs conventionally used in this application but having NORZON, (Registered Trademark of Norton Company), abrasive grain (fused polycrystalline alumina-zirconia) thereon. The tests were conducted in silica-bronze sail joint (8"discs) (20.32 cm) area sanding operations. Coated abrasive discs in this application typically fail by edge chipping. The control discs were of the same construction as the tests discs except for the different grain used and different backing members.

Improved performance (7–8 cars vs. 5–6 cars) was obtained by using the coated abrasive discs (8"disc) of the invention in the case of sanding sail joints, compared to conventional paper discs used in this application.

EXAMPLE 5

The coated abrasive material of this invention prepared as described in Example I, except for the substitution of 170 lb/rm (288grams/sq.meter). Arjomari cylinder paper, was evaluated for peel adhesion against a control abrasive material, (identical except for the omission of the polymer film layer), with the results set forth below. Peel adhesion was determined as follows: The coated abrasive material manufactured above was cut inwardly of the edges thereof at random in the warp direction and then perpendicular thereto to provide two samples each measuring 5" (12.7 cm) (warp)×6" (15.24 cm).

These samples were then cleaned with alcohol and let dry for 30 minutes. To the abrasive grain side of each sample there was applied an adhesive composition mixed by hand comprising a 50/50 by weight blend of epoxy resins (Epon 828/Versamid 125) Registered Trademarks of, respectively, Shell Chemical Company and Hankel Corp. The two samples were then superposed one above the other, adhesive layer contacting adhesive layer. A 50 lb. (22.7 kg) weight was placed on top of this sandwich and the epoxy resins were allowed to cure over a period of 24 hours. The weight was then removed and the sandwich was then cut to provide a 3" (7.6 cm) wide sample out of the center. The edges were discarded.

The 3" (7.6 cm) wide sample was then cut into three 1" (2.54 cm) wide samples. These samples were then tested for peel adhesion on a conventional Instron Tensile Tester using the following conditions: 3" (7.6 cm) gauge opening, chart speed 5"/min. (12.7 cm), cross-head (jaw) speed 5"/min. (12.7 cm) Range 50 lbs. (22.7 kg). The peel strength is measure ate 180 degrees (82.2 degrees C.) with the end of one coated abrasive sample member of the 1" (2.54 cm) sandwich being held in the top jaw and the corresponding end of the other coated abrasive sample being held in the bottom jaw. Like samples were obtained from the control coated abrasive material and peel adhesion tested. The results (avg. of six tests) are given below:

| ITEM | Peel Adhesion Test PEEL ADHESION LBS. |
|---|---|
| Coated Abrasive of Invention | 6.3 lbs/inch (1126 grams/cm) |

| -continued | |
|---|---|
| Peel Adhesion Test | |
| ITEM | PEEL ADHESION LBS. |
| Control | 5.1 lbs/inch |
| | (912 grams/cm) |

In the control sample, failure occurred at the backing/maker interface whereas with the coated abrasives of the invention, the paper backing ripped. Thus, it is seen that the combination backing member of the invention provides improved resistance to delamination compared to the filled/front sized backing member now used in the otherwise identical coated abrasive material.

EXAMPLE 6

This example evaluates the suitability of various polymer films in the products of the present invention. In each case the polymers were extrusion coated to a paper substrate to produce an abrasive disc substantially as described in Example 1. The discs were tested to failure which was when they showed significant edge chipping or when they ripped. This latter failure mode occurred when the abrasive had worn through and the backing contacted the workpiece. Edge chipping could also give rise to ripping if not observed in time.

The time to failure is given along with the subjective evaluation of the disc condition after the completion of the test.

| POLYMER FILM | TIME TO FAIL (MIN.) | CONDITION OF DISC * |
|---|---|---|
| None | <1 | 1 |
| Surlyn 1652-1 | 4 | 10 |
| Surlyn 1652-1 (2) | 4 | 10 |
| Surlyn 7940 | 4 | 9 |
| Surlyn 7940 (2) | 4 | 8 |
| Surlyn 8550 | 4 | 4 |
| Surlyn 9450 | 3 | 2 |
| ATX 310 | 4 | 10 |
| ATX 310 (2) | 4 | 9 |
| **Ethylene/methyl acrylate copolymer | 0 | 0 |
| Unirez 2654 (Polyamide) | 1 | 1 |
| Unirez 2645 (Polyamide) | 4 | 9 |
| Polyethylene | 4 | 2 |

*Ranking from 1 to 10 where 1 is poor and 10 is excellent.
**Not tested—the make resin did not adhere to polymer film.

EXAMPLE 7

This example shows the effect of the thickness of the film on the edge shedding resistance of the disc of the invention.

Abrasive discs were made by the process of Example 1 using the same polymer film extruded onto a 170 lbs/rm (288 grams/sq.meter) cylinder paper substrate. The discs were evaluated using a palm sander available from Dynabrade, Inc. on 6061 aluminum using hand pressure. The discs were 6 inches (15.24 cm) in diameter and were mounted on a 6 inch (15.24 cm) 3M "Stikit" ® disc pad. Grinding was continued until significant edge shedding, (loss of abrasive at the edges as a result of separation from the backing), had occurred. The results are set forth below:

| FILM THICKNESS | SHEDDING TIME |
|---|---|
| None (commercial 3M "Regalite ® product) | 2 minutes |
| None | 15 seconds |
| 4 Mil (example 1)(0.102 mm) | 3.5 minutes |
| 4 Mil (0.102 mm) | 4 minutes |
| 2 Mil (0.051 mm) | 45 seconds |

From this it is clear that the preferred film thickness for the advantages of the invention to be clearly evident is from about 3 to 6 mil (0.076 0.152 mm).

As understood by those skilled in the art, various modifications and changes can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed and claimed.

What is claimed is:

1. Coated abrasives material having a flexible backing member comprising, in combination, a flexible paper bottom member having top and bottom surfaces and an ionomer film layer adhered to the top surface of the bottom member and a maker coat adhered to the surface of the film layer component of the backing member, said maker coat having abrasive grains secured thereto, the peel adhesion strength between the film layer and the maker coat adhered thereto being greater than the ply adhesion strength of the paper bottom member and is at least 6 lbs/in.

2. Coated abrasive material according to claim 1 wherein the ionomer is a zinc salt of an ethylene/organic acid copolymer.

3. Coated abrasive material according to claim 2 wherein the ionomer has a melt flow index of less than about 5.0 dg/min.

4. Coated abrasive material according to claim 1 in which the film thickness is from about 3 to about 6 mils (0.076–0.152 mm).

5. Coated abrasive material according to claim 1 wherein the paper bottom member is 130 to 170 lb/rm. (220–288 grams/sq.meter) cylinder paper.

6. Coated abrasive material according to claim 1 where in the smoothness (Ra) value of the top surface of the film is about 0.51 micron or less.

7. A coated abrasive material comprising a backing member, a cured maker layer bonded to a first surface of the backing member, and a plurality of abrasive grains secured by said maker to the backing member, wherein the backing member comprises in combination a substrate paper layer and an ionomer layer adhered to the substrate paper layer and providing the first surface of the backing member, and the peel adhesion strength of the bond between the maker coat and the first surface of the backing member is greater than the ply adhesion strength of the paper layer and exceeds 6 lbs/in (1072 grams/cm).

* * * * *